TAPE TRANSPORT MECHANISM WITH SIGNAL MUTING MEANS

Filed Dec. 31, 1962 2 Sheets-Sheet 1

INVENTOR
DANIEL C. CHANG

BY [signature] ATTORNEYS

TAPE TRANSPORT MECHANISM WITH SIGNAL MUTING MEANS

Filed Dec. 31, 1962 2 Sheets-Sheet 2

INVENTOR
DANIEL C. CHANG

BY [signature]
ATTORNEYS

United States Patent Office 3,334,194

Patented Aug. 1, 1967

3,334,194

TAPE TRANSPORT MECHANISM WITH SIGNAL MUTING MEANS

Daniel C. Chang, 1 Roosevelt Road, Sec. 1, Taipei, Taiwan

Filed Dec. 31, 1962, Ser. No. 248,610
12 Claims. (Cl. 179—100.2)

This invention relates in general to the automatic control of a tape transport mechanism. It aims particularly to improve the search for a desired recording and to provide an automatic repeat for tape recorders by using marks on the tape as the controlling medium and a controlling assembly, preferably in the form of a relay assembly as the controlling unit, which, after sensing the marks on the tape, will adjust the recorder automatically. But the same technique may be applied to other types of tape machines as well.

Heretofore, tape transport mechanisms have had difficulty in locating the exact starting point of the desired recording during fast forward or rewind for searching of the tape. If stopped before the beginning of the desired recording, there would be unwanted recording preceding the desired recording. If stopped at other than the exact starting point, one would miss an early part of the desired recording.

It is an object of the present invention to provide an automatic control for the tape transport mechanism to locate the desired recording on the tape at the exact starting point.

It is also an object of the present invention to provide an automatic control to repeat any desired recording on the tape for facilitating language training and other purposes.

It is also an object of the present invention to extend the automatic control in multiple controlling levels. For instance, some shorter recordings such as one song in a reel, one part of a symphony or one paragraph of a language lesson may be assigned to a lower or short controlling level or period, and some longer recording such as a reel of songs, a whole symphony or a whole language lesson may be assigned to a higher or long controlling level or period. With a controlling level switch set at low level, the automatic control is applied to each shorter recording, and with the same switch set at high level, the automatic control is applied to each longer recording. In language training, this device makes it possible for the listener to repeat the text, lesson by lesson, or, paragraph by paragraph, as he pleases. However, the controlling levels are not necessarily limited in number and may be in excess of two. Nor are the applications of the invention restricted to language training.

Figure 2:
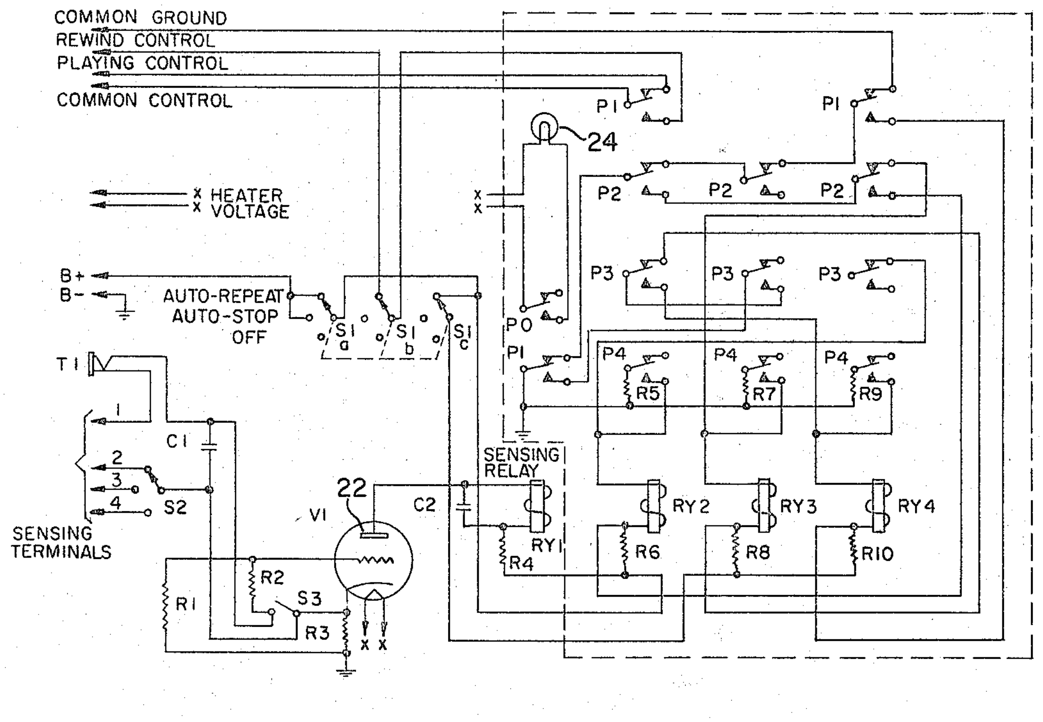
Figure 1:
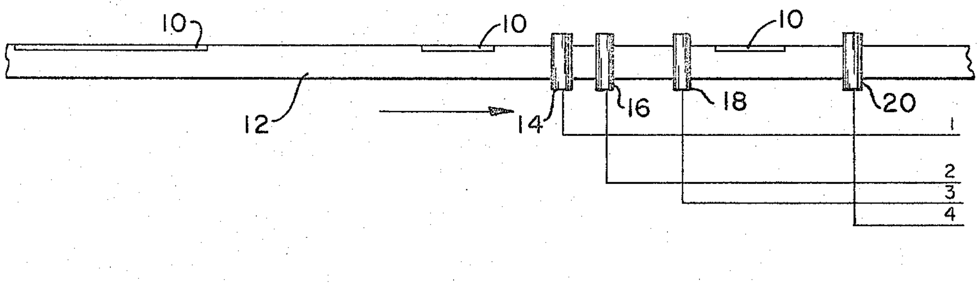

Objects and advantages other than those above set forth will be apparent from the following description when read in connection with the accompanying drawings, in which:

FIG. 1 is a diagrammatic view disclosing a tape with markings thereon and associated sensing mechanism, FIG. 2 is a circuit diagram of controlling relay assembly utilized with a recorder and reproducer, and FIGS. 3 to 9 are diagrams showing the progressive positions of relay contacts as pulse transmission occurs in the assembly.

The method used to achieve this automatic control is to break down the controlling function into marks 10 set on the tape 12 as shown in FIG. 1 for separating and identifying the sections of the recording and to provide a relay assembly used in conjunction with a sensing station opposite the tape for translating the marks sensed into appropriate actions during the controlling cycle. In the controlling cycle, it is assumed that the cycle begins with normal playing of a certain recording. The device will command the rewind mechanism to pull the tape back to the starting point before playing is resumed. In prior art devices, due to the inertia of rewinding, there is always an overrunning of the tape even though the rewinding action is actually stopped at the starting point, and the tape is then moved forward. If the sound reproduction is resumed at this point, as it is in prior art devices, a part of the unwanted recording of the preceding section will be heard. To overcome this difficulty, the invention provides a device which mutes the sound until the tape has moved to the starting point of the same recording. Then the controlling cycle terminates with the repetition of the normal playing. By applying this method to a certain section of recording alone, it will provide an automatic repeat for the desired recording. By applying this method in conjunction with the fast forward or rewind control of the tape recorder, it will provide an automatic control for locating the exact starting point of the desired recording. By using different marks, as different lengths of marks, and appropriately differently spaced sensing devices with switching means for the differently spaced sensing devices, for discriminating the levels to be controlled, it will extend the automatic control to multiple levels. The basic function of this device is to perform an automatic repeat cycle, therefore this method is termed the repeat cycle method.

For adapting this method in practice, it is necessary to do three things: (1) to put marks on the tape as the controlling medium, (2) to incorporate a sensing station to read the marks, and (3) to construct a controlling unit to translate the marks into appropriate actions. In the following portion of the specification all these will be explained more fully.

The marks to be used may be conductive marks, magnetic marks, photo-electric marks or even blanks between successive recordings. In the specific example herein given, conductive marks are utilized and these may be placed on the tape with an electrographic or other conductive paint pencil. But other conductive material may be used as well. The width of the mark should be compatible with the track-width in use, and its length should be sufficient to insure an effective conduction with the electrodes at the sensing station. In case of multiple controlling levels, the marks for the high level control, for reasons which will soon become clear, should be longer than those for the low level control.

The low controlling level sensing station is composed of two terminals insulated from each other, as terminals 14 and 16, which can be constructed in the form of conductive posts or rollers insulatively secured on the tape recorder, these posts acting as a guide for the tape passed thereover and in contact therewith. It may be located on either side of the tape reading head, but its conducting area should be compatible with the mark made on the tape. The function of the sensing station is to provide a pair of open circuit switch terminals for an electrical circuit which will be closed when the conductive mark passes through the station. It is important that the contact between the mark and the sensing station should be electrically good. In case of multiple controlling levels, an additional insulated terminal or additional terminals, as 18 and 20, should be used, and one of the terminals in the low level sensing station should be switched to the additional terminal or one of the additional terminals. The distance between the additional terminal and the low level sensing station should be longer than the length of the lower controlling level mark so that the latter will not contact the sensing station while the switch is set on high level automatic control.

The controlling device consists of a relay assembly which will be energized by the marks on the tape passing through the sensing station. On the face of it, the marks on a certain section of the tape will pass or make conductions upon the sensing station three times during a repeat cycle thereby completing a circuit through it three times. The first completion of the circuit or conduction is made when the mark at the trailing end of the section reaches the sensing station, causing the tape recorder to rewind. The second completion of the circuit or conduction is made when the mark at the beginning of the same section or at the leading end of the same section reaches the sensing station, causing the tape recorder to stop rewinding and to start forwarding. But due to the inertia explained before, the start mark will pass the sensing station for a short distance before the forwarding takes place. When forwarding is resumed, the start mark will pass the sensing station the second time, making another completion of the circuit or conduction between the sensing terminals of the station. But in terms of the functions of the relay assembly, this process should be understood as causing the following six operations:

(1) The end or trailing mark reaching the sensing station. This is to be recognized as the first conduction.

(2) The end mark leaving the sensing station. This is to be recognized as the first non-conduction.

(3) The start mark reaching the sensing station. This is to be recognized as the second conduction.

(4) The start mark leaving the sensing station. This is to be recognized as the second non-conduction.

(5) The start mark reaching the sensing station again. This is to be recognized as the third conduction.

(6) The start mark leaving the sensing station again. This is to be recognized as the third non-conduction.

The circuit diagram of the controlling relay assembly is shown in FIG. 2, which will take appropriate actions according to the above-mentioned operations. There are three functional units in the circuit, namely: (a) the sensing relay, $RY_1$, (b) the controlling relays, $RY_2$, $RY_3$ and $RY_4$, associated with the poles $P_1$, $P_2$, $P_3$, and $P_4$, respectively, and (c) the switch arrangements designated as $S_1$, $S_2$ and $S_3$. The sensing relay $RY_1$ is controlled via an amplifier employing a triode 22 provided with grid leak resistor $R_1$, a resistor $R_2$, which may be placed in series with the resistance of the mark but which total resistance of $R_2$ and the mark is less than that of $R_1$, and a grid biasing resistor $R_3$. Each of the relays $RY_1$, $RY_2$, $RY_3$ and $RY_4$ is provided with a resistor, respectively $R_4$, $R_6$, $R_8$ and $R_{10}$ to limit the current flow through the relay coil when the relay is pulsed. Further resistors $R_5$, $R_7$ and $R_9$ are provided to further limit the current flow through the coils to a safe holding value of current when the relays are locked in.

In order to prolong the pulse being transmitted from the recorder and reproducer to the relay assembly, a capacity $C_1$ is incorporated into the input to the triode in shunt with the sensing terminals, and a second capacitor $C_2$ bridges the sensing relay coil of relay $RY_2$. A pulse from the sensing station is transmitted to the grid of the triode 22 via line 1 and one of lines 2, 3 or 4, dependent on the manual setting of the controlling level switch $S_2$ to raise the potential of the grid. The output from the tube is fed to the sensing relay $RY_2$. In normal condition, the grid of the triode 22 is biased to keep the tube substantially non-conducting and the sensing relay $RY_1$ de-energized or idle. When conduction is made between the sensing terminals, it will increase the grid potential resulting in an increase in plate current of the tube so as to actuate relay $RY_1$. The actuation and restoration of the relay $RY_1$ are used to translate the marks sensed into appropriate actions as specified in the operations during the repeat cycle. The sensitivity of the amplifying tube is very high. Even though the resistance of the mark may be as high as 20 megohms, it will still actuate the controlling relays satisfactorily. The relay $RY_1$ also controls a pole $P_0$ which will illuminate a pilot light 24 each time a mark is at the sensing station.

The controlling relays, shown as enclosed by the dotted lines in FIG. 2, are wired in self-latching circuitry. A series of latchings and resets of these relays together with the wirings of the relay poles provide a logical path through which a proper control function may be executed at the specified steps. FIGURES 3–9 show the working conditions at each operation during the repeat cycle.

Figures 3, 4, 5, 6, 7, 8, 9:
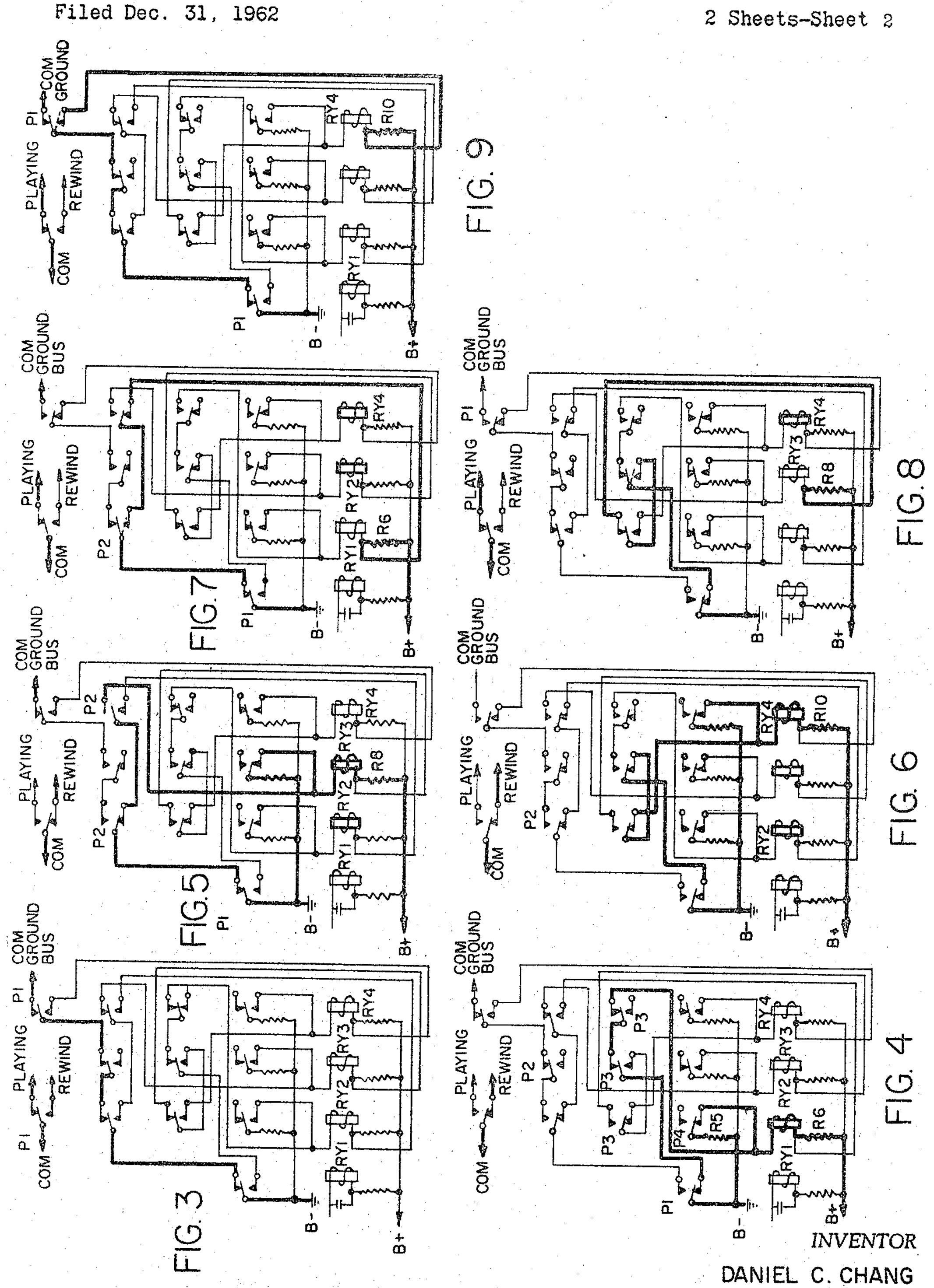

FIG. 3 shows the normal unoperation condition of the device and shows that all of the relays are de-energized or idle and all poles or switching armatures on these relays are in normal relay unenergized positions closed on the upper contacts. This condition corresponds to the beginning of the repeat cycle while the tape recorder is in normal playing condition. The pole $P_1$ of the relay $RY_2$ is used to control the rewinding and the playing mechanisms of the tape recorder and reproducer. This is effected by breaking into the line which feeds B voltage to the reproducer, as by breaking into a common B− line to prevent direct connection to ground, and into the line which controls the rewind in the reproducer. This arrangement proves to be most satisfactory with conventional tape recorders, as the tape recorder and reproducer sold by Uher Werke München under the trade name "Universal," because the tape mechanism will shift from rewinding directly into playing condition. If other types of tape mechanism are used, it may be necessary to convert the mechanism in such a way that only rewinding and playing are to be controlled by the pole $P_1$ of the relay $RY_2$. When the relay is idle, the pole $P_1$ of relay $RY_2$ is thrown to playing position. Otherwise, it will be shifted to rewinding position. In the latter case, the tape recorder and reproducer will begin to rewind provided the rewind control circuit via pole $S_{1b}$ of which $S_1$ to be described, is connected. If the rewind control circuit is not connected, the tape recorder will simply come to a stop. An important point is that the common ground bus of the amplifier of the tape reproducer, and which completes the circuit to ground for the B supply in the tape reproducer, is connected to ground via the normally closed terminal of the pole $P_1$ of relay $RY_4$ instead of directly to ground in the tape reproducer. This will enable the B supply of the tape recorder to be in circuit only in normal playing position. The pole $P_1$ of relay $RY_4$ provides for the B supply to be on when the control mechanism is idle or in playing position and for the B supply to be cut off when the control mechanism is in position such that the tape is rewinding. The bold lines in FIG. 3 indicate that the circuit is such that it only permits the reproducer to play with sound reproduction.

FIG. 4 shows the condition corresponding to the first closure of the circuit through the terminals or the first conduction. Once the pole $P_1$ of the relay $RY_1$ is thrown or the first conduction. Once the pole $P_1$ of the relay $RY_1$ is thrown to close the normally open contact, as actuated by the mark, the relay $RY_2$ is energized by the current flowing via the series resistor $R_6$ and the poles $P_3$ of the relays $RY_4$ and $RY_3$, respectively, as is indicated by the bold lines in FIG. 4. Then, all the poles on $RY_2$ are thrown to close their normally open contacts. When the relay is energized, it is held locked in by current flow from B+ through $R_5$ and the relay coil, the pole $P_4$ of $RY_2$, another series resistor $R_5$ and ground back to the negative side of the B supply. This will keep the recorder in fact rewinding even after the initial actuating pulse has been removed. In the meanwhile, the B supply of the tape reproducer is cut off by opening of the common ground line at $P_1$ of sensing relay $RY_1$ until the repeat cycle is completed.

FIG. 5 shows the condition corresponding after the termination of the first pulse. Once the mark leaves the sensing station, the pole $P_1$ of the relay $RY_1$ restores to its normal position. This will in turn close the circuit, as indicated by the bold lines, via the normally open contact of pole $P_2$ of relay $RY_2$, the normally closed contact of pole $P_2$ of $RY_4$ to the coil of $RY_3$, to latch the relay $RY_3$ and throw all its poles to close the normally open contacts. At this time, it will have no effect on the tape mechanism which is still in rewinding condition. But it provides a logical means to identify the mark sensed in the next step.

FIG. 6 shows the condition corresponding to the second closure of the circuit at the terminals or second conduction. The relay $RY_4$ is latched in a similar manner as indicated by the bold lines, and the tape mechanism is still in rewinding condition.

FIG. 7 shows the condition corresponding to the time after the second pulse or the time of second non-conduction. Before the pole $P_1$ of the relay $RY_1$ is released to its normally closed contact, the pole $P_2$ of the relay $RY_2$ is on its normally open contact as indicated by the dotted lines. When the pole $P_1$ of the relay $RY_1$ is released, this would conduct a shunt circuit through the resistance $R_6$ of $RY_2$ about the coil of $RY_2$ tending to reset the relay $RY_2$, as indicated by the bold lines. Because the shunt circuit is transient and the shorting current is low, being limited by the resistor $R_6$, this action will not cause any damage to the circuit but the current in the coil of $RY_2$ will fall so as to unlatch the relay, causing the poles of the relay to move to their normal positions. After all the poles on the relay $RY_2$ return to their normal positions, the tape mechanism is reversed to move the tape in a playing direction. But since the B supply is still cut off at this time by reason of shift of poles $P_2$ on $RY_3$ and $P_1$ on $RY_4$ away from their normally closed contacts, no sound will be heard.

FIG. 8 shows the condition corresponding to the third pulse being transmitted or the third conduction. This pulse momentarily substantially short circuits $RY_3$ and resets it in a manner as indicated by the bold lines, similar to the resetting of $RY_2$, and this too will have no effect on the tape mechanism which is still in playing condition because pole $P_1$ of $RY_4$ is in down position.

FIG. 9 shows the condition corresponding to the condition existing after the third pulse or at the time of the third non-conduction. The pole $P_1$ of $RY_1$ is again released to its normal position. This resets the relay $RY_4$ as indicated by bold lines in a manner similar to the resetting of $RY_2$ and $RY_3$. When relay $RY_4$ resets, the pole $P_1$ thereof recompletes the common ground circuit to the tape recorder completing the B circuit thereof, and sound reproduction will be resumed at this point. Thus, a repeat cycle is now completed.

All the relays used in this circuit are of high resistance DC type. They only draw a very small amount of current.

The circuit illustrated above is designed to execute the repeat cycle control over the tape recorder in response to the marks sensed reliably even when the rewind is fast. This high performance is achieved with no moving parts in the control circuit except the relays proper. But for achieving the repeat cycle control, some other less efficient alternatives also can be used.

One of the alternatives is using a stepping relay to replace the controlling relays enclosed by the dotted lines in FIG. 1. Once the relay $RY_1$ is actuated, it will advance the stepping relay one step further. The stepping relay is connected to a three pole multiple position switch of which the number of positions can be any multiples of three. The movement of the switch from position to position is similar in effect to the actuation of the mark. But the stepping relay has more moving parts which might go wrong, and this method also tends to consume more electricity.

The third and last part of my device is a special switch arrangement which will help to achieve the three basic objects of this invention mentioned in the beginning. As shown in FIG. 2, the switch $S_1$ is a three pole three position switch which may be termed the automatic control switch. With this switch set at the AUTO-REPEAT position, the rewind control is connected to the normal open terminal of the pole $P_1$ of the relay $RY_2$ via the switch pole $S_{1b}$, and the B+ is connected to all the relays via the switch poles $S_{1a}$ and $S_{1c}$. When the switch is turned to the AUTO-STOP position, the rewind control is disconnected. This will cause the tape machine to stop so long as the relay $RY_2$ is latched. Under this condition, the B supply for the relays $RY_3$ and $RY_4$ is also disconnected, and the tape machine is in a stand-by position for rewind. If rewind is desired, one should turn the switch to AUTO-REPEAT. If not, one may turn the switch to OFF position, under which condition the B supply for all relays are disconnected, and the automatic control is ineffective.

The switch $S_2$ in FIG. 2 is a single pole multiple position switch which may be termed the controlling level switch. This switch is used for choosing a proper pair of sensing terminals in case of multiple level control which may be any number in excess of one. The switch $S_3$ in the same diagram is a spring biased, normally open switch which may be termed the manual actuation switch. The purpose of this switch is to repeat the recording by manual actuation even before the end mark reaches the sensing station.

As to the application of the present invention, it is unnecessary to set any limitation here. However, a few interesting examples are set forth in the following:

*For searching of a desired recording.*—In this application, the automatic control switch should be set at AUTO-STOP in the beginning. Suppose the marks have already been put on the tape, and the desired recording is between, say, 200 and 250 as referred to the index counter of the tape recorder and reproducer; one should then push the fast forward or the rewind button on the recorder as the case may be depending on whether the tape is before or after the gap between the marks 200 and 250. When any number between 200 and 250 appears in the counter, one should turn the automatic control switch to AUTO-REPEAT, and the tape recorder will rewind and reproduce the desired recording automatically at the exact starting point. This simplicity in operation is achieved by coupling the automatic control switch with the push button reset bar mechanically so that it will turn the switch and reset the fast forward or the rewind button in one action.

*For language training.*—In this application, lower level controlling marks (short marks) may be assigned to each paragraph and higher level (long marks) controlling marks may be assigned to each lesson. By using the automatic control switch and the controlling level switch in a manner explained before, one may choose to repeat either a paragraph or a lesson automatically. It will be repeated in any number of times until the automatic control switch is turned off from AUTO-REPEAT.

*For stenographical use.*—In this application, marks should be put on the tape in such a way that each section of the tape may be used for five or ten seconds' recording. When the pre-marked tape is to be played back for dictation, the automatic control switch should be set at AUTO-REPEAT, and a pedal switch may be connected to the jack $J_1$ in FIG. 2. If the stenographer fails to catch a certain word or sentence in the recording, he may simply push the pedal switch, and a short passage including the questionable words will be repeated automatically until the stenographer pushes the same switch again.

What is claimed is:

1. In the circuit of a record tape reproducer of the type having a sound system and a tape driving means directly reversible from playing forward drive to fast forward or reverse drive rotation and back, a sensing device to sense the passage of marks longitudinally spaced on the tape, and a controlling assembly controlled by said marks, means in said assembly to control the reversal of said drive upon the passage of a second mark on said tape past the sensing means, and to condition the circuit for forward drive upon reverse movement of the tape and passage of the first mark opposite to and past the sensing device, and additional circuit means to mute the sound system of the reproducer until the first mark has again been sensed by the sensing means in the forward direction of drive of said tape.

2. The circuit as claimed in claim 1 in which the sensing means comprises three or more electrode elements variably spaced along the length of travel of the tape, and switch means are provided in the controlling assembly to, at will, connect with the electrode elements to select the desired length of passage on the tape for playing or repeat playing.

3. The circuit as claimed in claim 1 in which said circuit includes four relays, the first one of said relays constituting a sensing relay and being energized and deenergized in accordance with the position of a mark on the tape relative to the sensing means and successively energizing the other relays in turn, the other relays being self-locking when energized, and an intercontrol between said other relays to successively enable the locking up of a succeeding relay by the sensing relay, and successive release of the other relays from the sensing relay and in which circuit the means to mute the sound system comprises switches opened by each of the four relays when the same is energized.

4. The circuit as claimed in claim 3 in which a capacitor is shunted about the first relay to prolong the energized condition thereof.

5. The circuit as claimed in claim 1 in which means are incorporated to, at will, enable the repeat cycling of the controlling assembly, the stoppage of the motor after the first playback cycle and the disabling of the assembly to allow the recorder to function unaffected by the marks on said tape.

6. The circuit as claimed in claim 1 in which manual switch means is provided to enable the reverse drive of the tape to take place independently of the control exercised by the second of the marks on the tape.

7. The circuit as claimed in claim 1 in which a manual switch means is employed in shunt with the sensing means to enable reverse drive of the tape to take place independently of the marks on the tape.

8. The circuit as claimed in claim 3 in which there is interposed a high impedance input, low impedance output between the sensing means and the sensing relay.

9. The circuit as claimed in claim 8 in which a capacitor bridges the high impedance input to prolong the input pulse to the high impedance input.

10. For use with a record tape recorder and reproducer, having tape driving means directly reversible from forward drive to reverse drive rotation and back, a sensing device to sense the passage of spaced apart marks on the tape and a controlling assembly controlled by said marks to effect the forward and reverse drive of said tape, an amplifier in circuit between the sensing device and the controlling assembly, said amplifier comprising an electron tube having a grid, and a biasing resistor between cathode and ground, a high value grid leak resistor connected between grid and ground, and a second resistor of less value than the grid leak resistor between the grid and cathode, the connection between the grid and cathode being under control of the sensing device to enable change in current flow through the electron tube to take place.

11. For use with a record tape recorder and reproducer, having tape driving means directly reversible from forward drive to reverse drive rotation and back, a sensing device to sense the passage of spaced apart marks on the tape and a controlling assembly controlled by said marks to effect the forward and reverse drive of said tape, said controlling assembly including a self-locking relay in a circuit, said circuit including a source of current, a resistor having one end connected to a terminal of said source of current and at its other end to the coil of said relay, the other end of the coil being connected with a normally open contact of said relay, the pole of said relay which closes on said contact being connected with a second resistor the opposite end of which is connected with the other terminal of the source of current, and circuit means to short circuit the first resistor to release the relay.

12. In the circuit of a record tape reproducer of the type having an output sytem and a tape driving means reversible from normal playing drive to fast forward or reverse drive rotation and back, a sensing device to sense the passage of marks longitudinally spaced on the tape, and a controlling assembly controlled by said marks, means in said assembly to control the reversal of said drive in high speed upon the first occurrence of a mark on said tape past the sensing means, and to condition the circuit for original drive upon the second occurrence of a mark opposite to and past the sensing means during reverse movement of the tape, and additional circuit means to disable the output system of the reproducer until the third occurence of a mark past the sensing means in the original direction of drive of said tape.

References Cited

UNITED STATES PATENTS

| | | | |
|---|---|---|---|
| 2,631,855 | 3/1953 | Kornrei | 179—100.2 |
| 2,633,503 | 3/1953 | Camras | 179—100.2 |
| 2,793,253 | 5/1957 | Howey | 179—100.2 |
| 2,819,940 | 1/1958 | Sorrels | 179—100.2 |
| 2,900,132 | 8/1959 | Burns et al. | 179—100.2 |
| 2,904,777 | 9/1959 | Cox et al. | 340—174.1 X |
| 2,933,319 | 5/1960 | Proctor | 179—100.2 |

BERNARD KONICK, *Primary Examiner.*

A. BERNARD, V. P. CANNEY, *Assistant Examiners.*

UNITED STATES PATENT OFFICE
CERTIFICATE OF CORRECTION

Patent No. 3,334,194 August 1, 1967

Daniel C. Chang

It is certified that error appears in the above identified patent and that said Letters Patent are hereby corrected as shown below:

Column 3, lines 56 and 61, "$RY_2$", each occurrence, should read -- $RY_1$ --. Column 4, lines 53 and 54, cancel "or the first conduction. Once the pole $P_1$ of the relay $RY_1$ is thrown"; line 61, "$R_5$" should read -- $R_6$ --.

Signed and sealed this 12th day of August 1969.

(SEAL)
Attest:

Edward M. Fletcher, Jr.
Attesting Officer

WILLIAM E. SCHUYLER, JR.
Commissioner of Patents